(12) United States Patent
Hessling-Von Heimendahl et al.

(10) Patent No.: US 10,538,332 B2
(45) Date of Patent: Jan. 21, 2020

(54) AIRCRAFT PASSENGER SERVICE UNIT MOUNTING KIT

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 460 days.

(21) Appl. No.: 15/277,639

(22) Filed: Sep. 27, 2016

(65) Prior Publication Data

US 2017/0088264 A1 Mar. 30, 2017

(30) Foreign Application Priority Data

Sep. 28, 2015 (EP) ..................................... 15187193

(51) Int. Cl.
*B64D 11/00* (2006.01)

(52) U.S. Cl.
CPC ...... *B64D 11/00* (2013.01); *B64D 2011/0046* (2013.01); *B64D 2011/0053* (2013.01); *B64D 2231/025* (2013.01)

(58) Field of Classification Search
CPC .................. B64D 11/00; B64D 11/003; B64D 2011/0046; B64D 2011/0053; B64D 2231/025; B64D 11/0015; B64D 2011/0038; B64C 1/066; B64C 1/12; Y02T 50/46

USPC .................. 244/118.5; 16/221, 226, 356, 360
See application file for complete search history.

(56) References Cited

U.S. PATENT DOCUMENTS

| | | | | |
|---|---|---|---|---|
| 4,100,648 A | * | 7/1978 | Krautter | E05D 11/1021 16/294 |
| 4,922,987 A | * | 5/1990 | Marontate | E05D 15/26 160/183 |
| 5,311,643 A | * | 5/1994 | Marquardt | B64D 11/00 16/267 |

(Continued)

OTHER PUBLICATIONS

Architectural Builders Hardware Manufacturing, Inc., Stainless Steel Continuous Pin & Barrel Hinges, 2015, ABH Mfg., Inc., v1.1 (Year: 2015).*

(Continued)

*Primary Examiner* — Richard R. Green
(74) *Attorney, Agent, or Firm* — Cantor Colburn LLP

(57) ABSTRACT

An aircraft passenger service unit kit includes an overhead passenger service unit panel including at least one hinge pin extending along an edge portion of the overhead passenger service unit panel and an elastic fixing element for fixing the overhead passenger service unit panel to an aircraft support structure. The fixing element includes at least one first end, which is configured for rotatably connecting with the at least one hinge pin; and at least one opposing second end, which is configured for engaging with a mounting rail of the aircraft support structure. The overhead passenger service unit panel further includes a forcing element, which is configured for acting onto the fixing element generating a tension within the fixing element for securely fixing the at least one second end of the fixing element to the mounting rail.

17 Claims, 4 Drawing Sheets

(56) References Cited

U.S. PATENT DOCUMENTS

| | | | | |
|---|---|---|---|---|
| 6,732,976 B2* | 5/2004 | Hessling | ................. | B64C 1/066 |
| | | | | 244/119 |
| 7,059,568 B2* | 6/2006 | Hessling | ............ | B60R 13/0206 |
| | | | | 244/129.1 |
| 7,191,991 B2* | 3/2007 | Kimura | ................... | B60R 11/02 |
| | | | | 248/221.11 |
| 8,429,794 B2* | 4/2013 | Tagtow | ................. | E05D 7/0423 |
| | | | | 16/235 |
| 2002/0089185 A1 | 7/2002 | Hessling et al. | | |
| 2003/0209632 A1 | 11/2003 | Hessling | | |
| 2007/0057121 A1* | 3/2007 | Callahan | ................. | H02G 3/00 |
| | | | | 244/118.5 |
| 2009/0108591 A1* | 4/2009 | De Vries | ............ | E05B 15/0245 |
| | | | | 292/64 |
| 2011/0024560 A1* | 2/2011 | Horst | .................... | B64D 11/00 |
| | | | | 244/118.5 |
| 2014/0145481 A1* | 5/2014 | Boren | ................... | B64D 11/06 |
| | | | | 297/248 |

OTHER PUBLICATIONS

European Search Report for Application No. 15187193.6-1754 dated Jan. 2, 2016. 9 pages.

* cited by examiner

AIRCRAFT PASSENGER SERVICE UNIT
MOUNTING KIT

FOREIGN PRIORITY

This application claims priority to European Patent Application No. 15 187 193.6 filed Sep. 28, 2015, the entire contents of which is incorporated herein by reference.

TECHNICAL FIELD

The invention is related to a mounting kit for an aircraft passenger service unit. In particular, it is related to the mounting of an overhead passenger service unit panel to the aircraft structure.

BACKGROUND

In today's aircraft cabins, panels of overhead passenger service units (PSUs), supporting components such as reading lights, oxygen masks, gaspers, loudspeakers, optical signs and switches, are most often mounted to a mounting rail preferably made of aluminum that keeps the panels from moving in most directions. However, when just hanging down from the mounting rail during installation, these panels are supposed to slide along the longitudinal direction of the mounting rail to allow for tolerance adjustment and pushing them in the right location. Once the final position is found, a stopper element ("x-stopper") is installed into a cut-out of a PSU to take the x-loads of the PSU weight in case of a crash, with x-loads referring to loads in the longitudinal direction of the aircraft. In a typical aircraft cabin, more than 120 x-stoppers need to be manually placed and tightened. This is a fairly tedious job, which costs time and money on the final assembly line. Also, the x-stoppers add considerable weight to the aircraft. Once tightened, there is no flexibility for a fast rearrangement of the PSUs. Thus, it is nearly impossible to change the layout of the aircraft cabin over night. Furthermore, non fastened stopper elements are not readily visible, as they are covered by the PSUs, and thus provide a considerable risk for hidden failures.

It therefore would be beneficial to provide an improved fastening structure for fastening overhead passenger service units at the aircraft support structure.

SUMMARY

Exemplary embodiments of the invention include an aircraft passenger service unit kit comprising an overhead passenger service unit panel. The aircraft passenger service unit kit further comprises a fixing element, which is configured for fixing the overhead passenger service unit panel to the aircraft support structure.

The overhead passenger service unit panel includes at least one hinge pin extending along an edge portion of the panel. The hinge pin allows the overhead passenger service unit panel to rotate with respect to a fixing element attached to said hinge pin.

The fixing element is an elastic fixing element and comprises at least one first end, which is configured for rotatably connecting with the at least one hinge pin; and at least one opposing second end, which is configured for engaging with a mounting rail of the aircraft support structure.

The overhead passenger service unit panel further comprises a forcing element, which is configured for acting onto the fixing element for generating a tension within the fixing element upon rotating the overhead passenger service unit panel with respect to the fixing element around the hinge pin. Said tension causes a deformation of the fixing element which results in securely fixing the at lest one second end of the fixing element to the mounting rail. Said tension within the fixing element leads to a tight engagement between the fixing element and the hinge pin on the one hand and the between the fixing element and the mounting rail on the other hand. This in turn allows for keeping the overhead passenger service panel securely in place in case of large x-loads, such as in crash conditions with acceleration of up to 15 g.

Exemplary embodiments of the invention further include a method of fixing an aircraft passenger service unit panel including at least one hinge pin extending along an edge portion of the panel to an aircraft support structure, wherein the method comprises:

a) connecting at least one first end of an elastic fixing element to the at least one hinge pin;

b) engaging at least one second end of the elastic fixing element with a mounting rail of the aircraft support structure; and c) generating a tension within the elastic fixing element for securely fixing the at lest one second end of the elastic fixing element to the mounting rail of the aircraft support structure.

Exemplary embodiments of the invention considerably facilitate the fastening overhead passenger service units at the aircraft support structure. This results in a considerable reduction of the time and costs needed for the final assembly. The reduction of the time, which is necessary for fastening overhead passenger service units, further permits changing the layout of the aircraft cabin over night, allowing a more flexible and economical use of the aircraft. Exemplary embodiments of the invention further reduce the weight of the fixing structure, which results in an more economical operation of the aircraft.

In an embodiment the overhead passenger service unit panel is pivoted with respect to the fixing element around the at least one hinge pin for engaging the at lest one second end of the elastic fixing element with the mounting rail of the aircraft aircraft support structure and for generating the tension within the elastic fixing element. This allows for a fast and easy installation of the overhead passenger service unit panel.

In an embodiment the tension within the fixing element is generated by pressing the forcing element against the fixing element. The forcing element in particular is pressed against the fixing element by pivoting the overhead passenger service unit panel with respect to the fixing element around the at least one hinge pin. This allows for a fast and easy installation of the overhead passenger service unit panel with only a single motion which results in both: (a) tightly engaging the at least one second end of the elastic fixing element with the mounting rail of the aircraft aircraft support structure and (b) generating the tension within the fixing element.

In an embodiment the at least one first end of the fixing element has a hook-shape, and the step of connecting the at least one first end of an elastic fixing element to the at least one hinge pin includes engaging the at least one hook-shaped first end with the at least one hinge pin. Hooking the at least one hook-shaped first end onto the at least one hinge pin provides a connection between the fixing element and the overhead passenger service unit panel that may be assembled fast and easily.

In an embodiment the at lest one second end of the fixing element has a hook-shape, and the step of engaging the at lest one second end of the elastic fixing element with the mounting rail of the aircraft support structure comprises engaging the at lest one hook-shaped second end with a mounting rail of the aircraft support structure. Hooking the at lest one hook-shaped second end onto a mounting rail of the aircraft support structure provides a connection between the fixing element and the aircraft support structure that may be assembled fast and easily.

In an embodiment the fixing element comprises a first portion next to the at lest one first end extending basically parallel to a plate portion of the overhead passenger service unit panel, when the overhead passenger service unit panel is fixed to the aircraft support structure. The fixing element further comprises a second portion next to the first position. The second portion and the at lest one first end are on opposite sides of the first portion. The second portion extends in an angle of 45° to 90° with respect to the plate portion of the overhead passenger service unit panel, when the overhead passenger service unit panel is fixed to the aircraft support structure. Thus, the first and second portions are arranged so that they form an angle with respect to each other. As the fixing element is made from an elastic material, the first and second portions may be moved with respect to each other changing the angle between them and generating a mechanical tension within the fixing element. In consequence, in an embodiment, the forcing element is configured for acting onto the first portion of the fixing element.

In an embodiment the fixing element further comprises a third portion next to the second position. The third portion and the first portion are on opposite sides of the second portion. The third portion is formed in an S-shape. A third portion having an S-shape is well suited for transferring the tension generated by bending the first and second portions with respect to each other, to the at lest one second end of the fixing element, which is engaged to the aircraft support structure.

In an embodiment the second portion and/or the third portion of the fixing element comprise a plurality of latches extending parallel to each other. A plurality of latches engages particularly well with a mounting rail of the aircraft support structure preventing the fixing element from considerably moving along the mounting rail in the longitudinal direction. In particular, in case the fixing element is slightly moved by means of an external force acting on the fixing element and/or the overhead passenger service unit panel, the edges will dig into the mounting rail considerably increasing the force acting between the fixing element and the mounting rail. By providing a plurality of latches, the number of edges digging into the mounting rail and thus the frictional force is increased for preventing further movement of the fixing element with respect to the mounting rail even more reliably.

In an embodiment the mounting rail is formed from a material which is weaker than the material used for forming the fixing element. In a particular embodiment, the mounting rail is made of aluminum or plastic, while the fixing element is made of steel, in particular passivated stainless steel. This allows the edges of the fixing element to dig easily into the mounting rail resulting in an increased holding force preventing longitudinal movement of the fixing element.

BRIEF DESCRIPTION OF THE DRAWINGS

Exemplary embodiments of the invention are described in greater detail below with reference to the enclosed figures.

DETAILED DESCRIPTION

Figure 1:
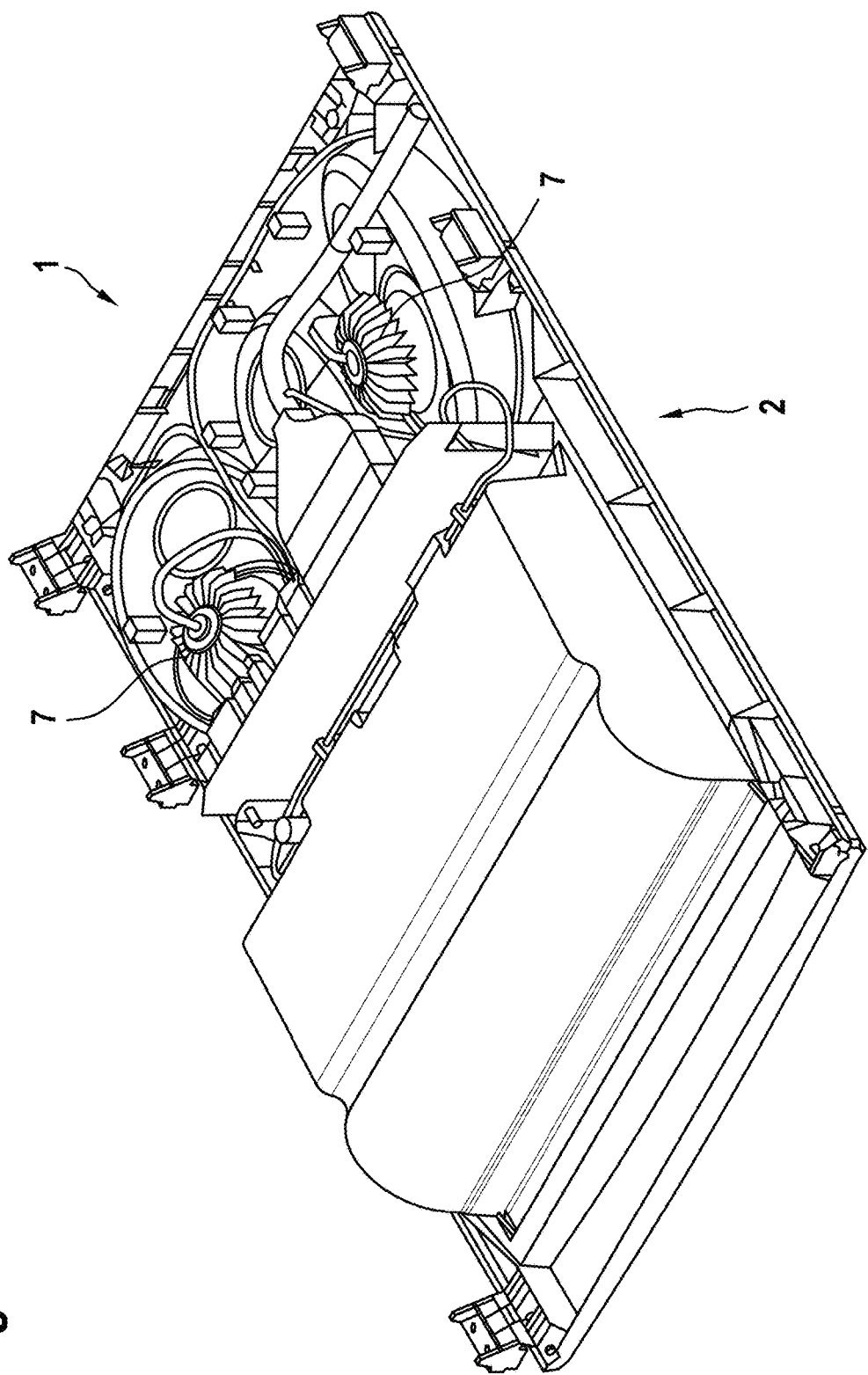
FIG. 1 is a perspective view showing the rear side of an overhead passenger service unit comprising a plurality of components.

FIG. 1 is a perspective view depicting the rear side of an overhead passenger service unit 1 comprising an overhead passenger service unit panel 2 supporting several components such as reading lights 7, oxygen masks, an oxygen candle, gaspers, loudspeakers, optical signs and switches. As the details of said components are not relevant for the present invention, these components are not shown in the following schematic illustrations in order to enhance the clarity of the illustration.

Figure 2:
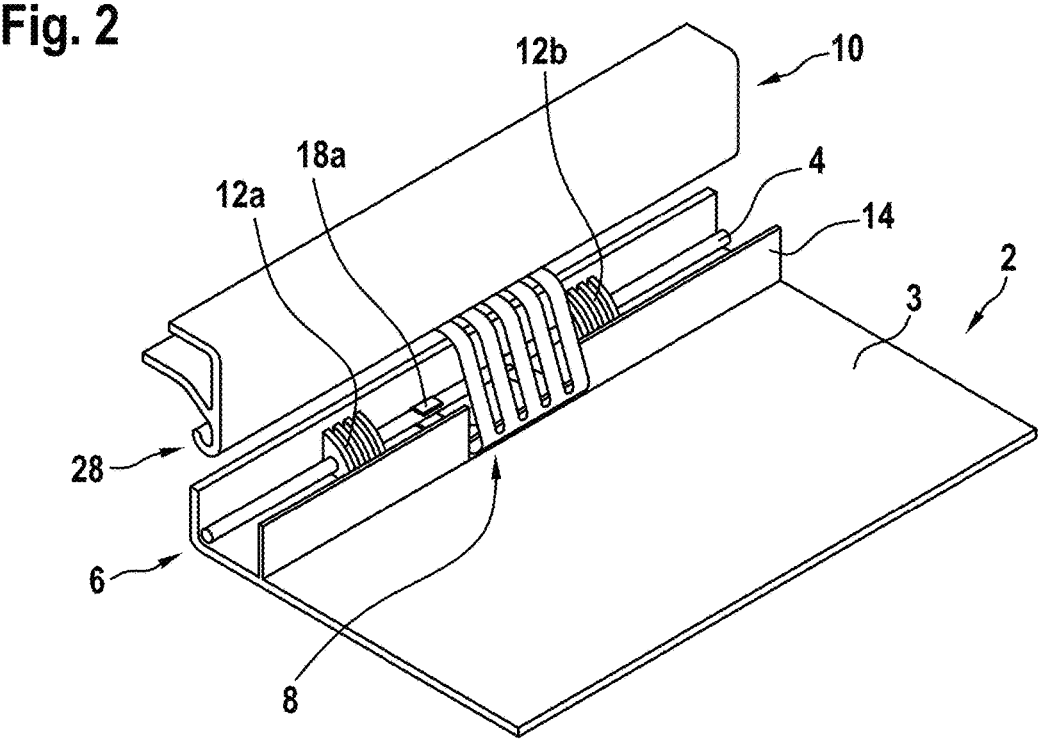
FIGS. 2 and 3 respectively depict perspective views of an overhead passenger service unit panel attached to a mounting rail of the aircraft support structure by means of an elastic fixing element according to an exemplary embodiment of the invention.
Figure 3:
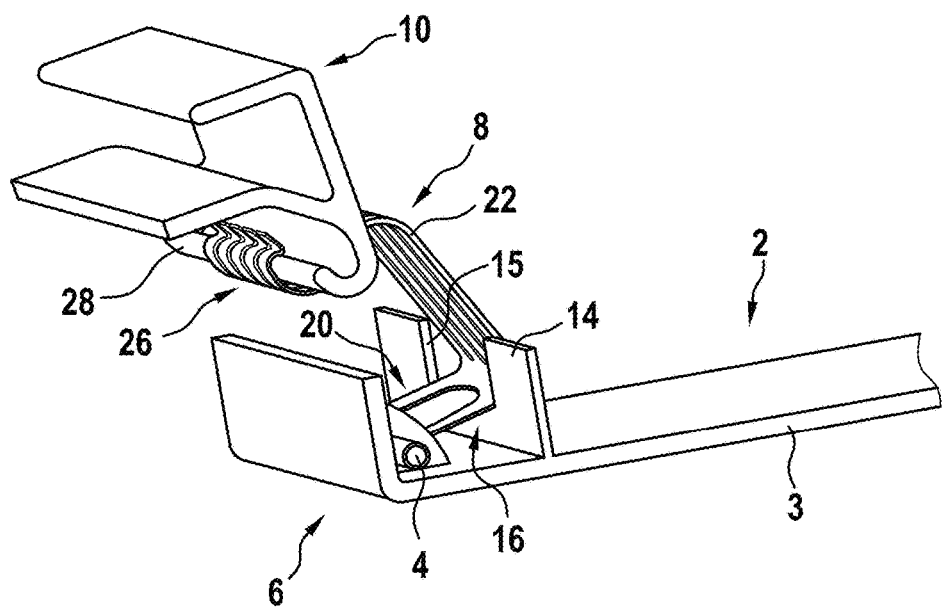

FIGS. 2 and 3 are perspective views of an overhead passenger service unit panel 2, which is attached to a mounting rail 10 of an aircraft support structure by means of an elastic fixing element 8 according to an exemplary embodiment of the invention.

Figure 4:
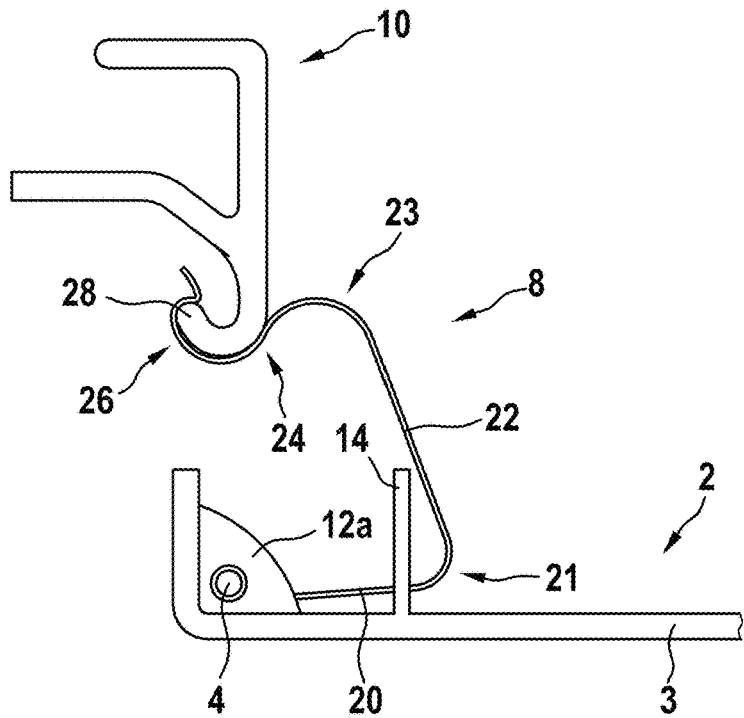
FIG. 4 shows a sectional side view of the unit panel, the elastic fixing element and the mounting rail in an engaged state.
Figure 5:
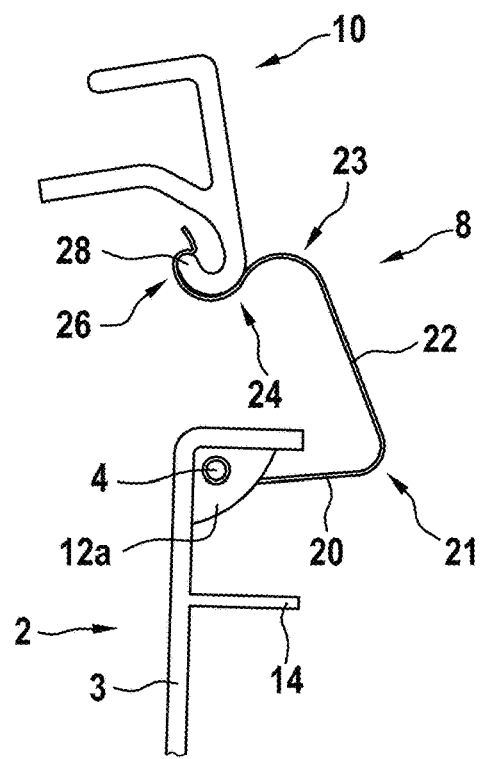
FIG. 5 shows a sectional side view of the overhead passenger service unit panel, the elastic fixing element and the mounting rail in a connected but non-engaged state.

FIG. 4 shows a sectional side view of the unit panel 2, the elastic fixing element 8 and the mounting rail 10 in an engaged state. FIG. 5 shows the overhead passenger service unit panel 2, the elastic fixing element 8 and the mounting rail 10 in a connected but non-engaged state with the overhead passenger service unit panel 2 hanging freely from the mounting rail 10. The term connected state refers to the fixing element 8, the overhead passenger service unit panel 2 and the mounting rail 10 being in contact, but not being fixed in position with respect to each other via the tension within the fixing element 8. The term engaged state refers to the state where the fixing element 8, the overhead passenger service unit panel 2 and the mounting rail 10 are fixed in position with respect to each other via the tension within the fixing element, said tension leading to a tight engagement between those elements. The overhead passenger service unit panel is also referred to be in a fixed position/fixed to the mounting rail, when in the engaged state, which is the normal operating position during use of the aircraft.

The overhead passenger service unit panel 2 comprises a plate portion 3, which is arranged basically horizontally, when the overhead passenger service unit panel 2 is fixed to the mounting rail 10 of the aircraft support structure.

Two holding structures 12a, 12b are arranged spaced apart from each other along a rear edge portion 6 of the overhead passenger service unit panel 2. A hinge pin 4 extending along the rear edge portion 6 of the overhead passenger service unit panel 2 is mounted to said overhead passenger service unit panel 2 by means of the two holding structures 12a, 12b.

Two hook-shaped first ends 18a, 18b (only one of which is visible in FIG. 2) of the elastic fixing element 8 are hooked onto the hinge pin 4 allowing the elastic fixing element 8 to pivot around the axis of the hinge pin 4.

An opposing second end 26 of the elastic fixing element 8 is provided with a plurality of hooks 26a-26e (see FIG. 6), which are coupled to a corresponding hook-shaped portion 28 of the mounting rail 10.

In a non-engaged state, as it is illustrated in FIG. 5, only a single portion of the hook-shaped second end 26 of the fixing element 8 contacts the mounting rail 10. In consequence, no significant friction force is generated between the fixing element 8 and the mounting rail 10. Thus, the fixing element 8 and the overhead passenger service unit panel 2 are able to move along the length of the mounting rail 10. This allows arranging the overhead passenger service unit panel 2 in a desired position along the length of the aircraft cabin.

The overhead passenger service unit panel 2 further comprises a rib 14, which extends basically orthogonally from the plate portion 3 of the overhead passenger service unit panel 2. The rib 14 has a recess, also referred to as opening, which is open to the side facing away from the plate portion 3, for accommodating a first portion 20 of the fixing element 8. Lateral edges 15 of the rib 14 defining the opening laterally prevent the elastic fixing element 8 from excessively moving with respect to the plate portion 3 in the longitudinal direction of the hinge pin 4. A portion 16 of the rib 14 defining the bottom of the opening acts as a forcing element, which presses against the first portion 20 of the elastic fixing element 8, when the overhead passenger service unit panel 2 is in an engaged state, as it is illustrated in FIGS. 2 to 4. The pressure provided by said portion 16 of the rib 14 generates a mechanical tension within the fixing element 8. Said tension causes the second portion 24 and the hook-shaped second end 26 to deform, securely engaging with the hook-shaped portion 28 of the mounting rail 10 by clamping the hook-shaped portion 28 of the mounting rail 10, as in particular illustrated in FIG. 4. It is pointed out that the overhead passenger service unit 2 may comprise various other structures that can act as the forcing element.

When a force attempts to move the overhead passenger service unit panel 2 in the x-direction of the aircraft, i.e. along the extension of the hinge pin 4, the fixing element 8 in particular will bend in two dimensions, causing the lateral edges and side portions of its hook-shaped second end 26 to dig into the outer surface of the mounting rail 10. This mechanical engagement considerably amplifies the frictional force between the fixing element 8 and the mounting rail 10 and thus inhibits any further movement of the fixing element 8 and the overhead passenger service unit panel 2 in the longitudinal direction, i.e. in the x-direction.

In order to enhance the process of digging portions of the second end 26 of the fixing element 8 into the mounting rail 10, at least the outer surface of the fixing element 8 may be formed from a material, which is harder than the mounting rail 10. For example, at least the outer surface of the mounting rail 10 may be made from a plastic material or as soft metal, such as aluminum, and the fixing element 8 may be made of steel, in particular passivated stainless steel.

Figure 6:
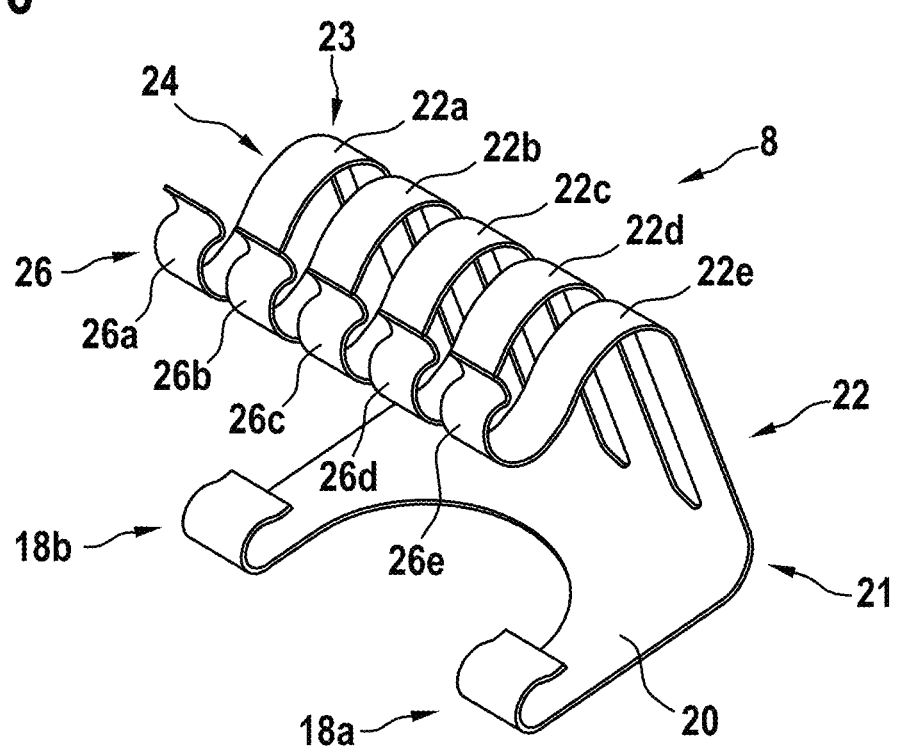
FIG. 6 illustrating a perspective view of a fixing element 8 according to an exemplary embodiment of the invention.

The configuration of the fixing element 8 is explained in the following in more detail with reference to FIG. 6, illustrating a perspective view of a fixing element 8 according to an exemplary embodiment of the invention.

The fixing element 8 comprises a first portion 20 next to the hook-shaped first ends 18a, 18b. The first portion 20 extends basically parallel to the plate portion 3 of the overhead passenger service unit panel 2, which is not shown in FIG. 6, when the overhead passenger service unit panel 2 is engaged with the aircraft support structure, as it is illustrated in FIGS. 2 to 4.

The fixing element 8 further comprises a second portion 22 adjacent the first portion 20 and opposite to the first ends 18a, 18b. The second portion 22 is connected to the first portion 20 by a first curvature portion 21 and extends in an angle of 45° to 90° with respect to first portion 20. Thus, the first and second portions 20, 22 form an angle with respect to each other.

As the fixing element 8 is made from an elastic material, in particular a thin metal sheet, the first curvature 21 is bendable and thus the angle between the first and second portions 20, 22 may be modified by bending the first curvature 21.

The fixing element 8 further comprises a third portion 24 next to the second portion 22 and opposite to the first portion 20. The third portion 24 includes the hook-shaped second end 26 and is formed in an S-shape with a second curvature 23 being provided between the adjacent second and third portions 22, 24.

In the embodiment shown in FIG. 6, the second portion 22 and the third portion 24 comprise a plurality of latches 22a-22e extending parallel to each other and forming a plurality of hooks 26a-26e at the second end 26 of the fixing element 8.

When the hook-shaped second end 26 is engaged with the corresponding hook-shaped portion of the mounting rail 10, pressing the portion 16 of the rib 14, which defines the lower edge of the opening formed within the rib 14, against the first portion 20 of the fixing element 8, as illustrated in FIGS. 2 to 4, generates a mechanical tension within the fixing element 8.

Due to the geometry of the fixing element 8, said tension is transferred via the second and third portions 22, 24 and the first and second curvatures 21, 23 to the hook-shaped second end 26. Said tension causes the S-shaped third portion 24, including the hook-shaped second end 26, to deform and to engage securely with the mounting rail 10 of the aircraft support structure for securely fixing the fixing element to the mounting rail 10.

As a result, the overhead passenger service unit panel 2 is securely fixed to the aircraft support structure. In particular, movement of the overhead passenger service unit panel 2 in the longitudinal direction of the mounting rail 10 is prevented by the frictional forces generated between the fixing element 8 and the mounting rail 10, as it has been described with reference to FIGS. 2 to 4.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:
1. Aircraft passenger service unit kit comprising
an overhead passenger service unit panel including at least one hinge pin extending along an edge portion of the overhead passenger service unit panel; and
an elastic fixing element for fixing the overhead passenger service unit panel to an aircraft support structure, the fixing element comprising:
at least one first end, which is configured for rotatably connecting with the at least one hinge pin; and at least one opposing second end, which is configured for engaging with a mounting rail of the aircraft support structure;

wherein the overhead passenger service unit panel further comprises a plate portion, which is arranged basically horizontally, when the overhead passenger service unit panel is fixed to the mounting rail, and a forcing element, which protrudes from the plate portion and is configured for pressing against the fixing element generating a tension within the fixing element which causes the fixing element to deform for securely fixing the at least one second end of the fixing element to the mounting rail.

2. The aircraft passenger service unit kit of claim 1, wherein at least one of the first and second ends of the fixing element has a hook shape.

3. The aircraft passenger service unit kit of claim 1, wherein the fixing element comprises:

a first portion next to the at least one first end extending at an angle of +/−5° with respect to a plate portion of the overhead passenger service unit panel, when the overhead passenger service unit panel is fixed to the aircraft support structure; and a second portion next to the first portion, wherein the second portion extends in an angle of 45° to 90° with respect to the plate portion of the overhead passenger service unit panel, when the overhead passenger service unit panel is fixed to the aircraft support structure.

4. The aircraft passenger service unit kit of claim 3, wherein the fixing element further comprises a third portion next to the second portion, wherein the third portion is formed in an S-shape.

5. The aircraft passenger service unit kit of claim 3, wherein the forcing element is configured to act onto the first portion of the fixing element.

6. The aircraft passenger service unit kit of claim 3, wherein the third portion of the fixing element comprise a plurality of latches extending parallel to each other.

7. The aircraft passenger service unit kit of claim 6, wherein the second portion of the fixing element comprise a plurality of latches extending parallel to each other.

8. The aircraft passenger service unit kit of claim 1, wherein the forcing element is formed as a rib extending parallel to the at least one hinge pin, wherein the rib in particular comprises a recess for accommodating the fixing element in order to prevent movement of the fixing element in a direction parallel to the hinge pin.

9. The aircraft passenger service unit kit of claim 1, wherein at least one of the hinge pin and the fixing element is made of steel.

10. A combination of an aircraft passenger service unit kit according to claim 1 and an aircraft support structure comprising a mounting rail, wherein the fixing element is made of a material which is harder than the surface of the mounting rail.

11. The combination of an aircraft passenger service unit kit and an aircraft support structure according to claim 10, wherein the surface of the mounting rail is made of aluminium or plastic, and the fixing element is made of steel.

12. The aircraft passenger service unit kit of claim 1, wherein at least one of the hinge pin and the fixing element is made of passivated stainless steel.

13. Method of fixing an overhead aircraft passenger service unit panel including a plate portion, which is arranged basically horizontally, when the overhead passenger service unit panel is fixed to a mounting rail of the aircraft support structure and at least one hinge pin extending along an edge portion of the overhead passenger service unit panel to an aircraft support structure, the method comprising:

a) connecting at least one first end of an elastic fixing element to the at least one hinge pin;

b) engaging at least one second end of the elastic fixing element with the mounting rail;

c) generating a tension within the elastic fixing element by pressing a forcing element, which protrudes from the plate portion of the overhead passenger service unit panel, against the elastic fixing element, which causes the fixing element to deform, for securely fixing the at least one second end of the elastic fixing element to the mounting rail of the aircraft support structure.

14. The method of claim 13 including pivoting the overhead passenger service unit panel with respect to the fixing element around the at least one hinge pin.

15. The method of claim 13, wherein the forcing element includes a rib extending basically orthogonally from the plate portion.

16. The method of claim 13, wherein the step of connecting the at least one first end of the fixing element with the at least one hinge pin comprises engaging a hook formed at the at least one first end with the at least one hinge pin.

17. The method of claim 13, wherein the step of engaging the at least one second end of the elastic fixing element with the mounting rail of the aircraft support structure comprises engaging a hook formed at the at least one second end with the mounting rail of the aircraft support structure.

* * * * *